Dec. 30, 1941.    A. IVANOFF    2,268,285
PLANT CONTROL METHOD AND SYSTEM
Filed April 8, 1939    3 Sheets-Sheet 1

Inventor:
Alexander Ivanoff;
By his attorneys,
Baldwin & Wight

Dec. 30, 1941.    A. IVANOFF    2,268,285
PLANT CONTROL METHOD AND SYSTEM
Filed April 8, 1939    3 Sheets-Sheet 3

Inventor:
Alexander Ivanoff;
By his attorneys,
Baldwin & Wight

Patented Dec. 30, 1941

2,268,285

UNITED STATES PATENT OFFICE

2,268,285

PLANT CONTROL METHOD AND SYSTEM

Alexander Ivanoff, Luton, England, assignor to Charles J. Tagliabue Mfg. Co., Brooklyn, N. Y., a corporation of New York Application April 8, 1939, Serial No. 266,915 In Great Britain February 15, 1938

22 Claims. (Cl. 236—67)

This invention relates to rapid yet stable control in a plant which tends to hunt under usual control and has for its main object the effecting of control which causes the variable being controlled to return (after a deviation) to its predetermined value without appreciable "hunting."

It is a further object of my invention to provide a novel and useful control system and method in which a change of a controlled variable in such a plant is detected and compensated for before the plant has a chance to start hunting.

A particular object is to provide such a control system with a damped regenerative oscillator (a "shadow plant") which has a higher frequency than that of the main plant and hence can respond sooner to a change of the controlled variable than can the main plant.

Still a further object is the provision in such a shadow plant of fluid and electrical damping means which are well suited to set up the phase relations between the initial and reactive changes of the shadow plant necessary for self-generated oscillations following a change in the controlled variable.

Further objects are the improvement of such a shadow plant controller by the addition of means which lessen its task as by the addition of a control component which depends upon the rate of the change and/or a reset for gradually bringing the controlled value back precisely to its set value instead of allowing it to settle to a new ultimate value within a "throttling range" of a proportional controller. Other objects will appear from the devices shown on the drawings and their description and that of their operation.

It is well known that a plant equipped with automatic control of a given type, if capable of hunting, has a certain natural frequency of oscillation which depends upon the proportions of the plant, on the conditions under which it is operated and upon the type and design of the automatic control equipment.

In carrying out the present invention, a control apparatus includes a "shadow plant" which is functionally similar, as to the control characteristics thereof, to the plant the condition of which is being controlled except that the shadow plant has a high frequency of oscillation compared with the hunting frequency of the main plant, say three or four times higher. This shadow plant and the main plant receive impulses in response to a change of the condition of the main plant from the desired condition, whereupon the shadow plant sets up an additional control impulse which is superposed on and modifies the control impulse transmitted to the main plant. It has been found that, in such a system, the shadow plant operates to anticipate the effect which will be produced in the main plant and in this way overcomes the inherent tendency of the main plant to oscillate so that the condition of the main plant being controlled returns, after a deviation from the desired condition, to the desired condition without hunting.

For best results, the shadow plant should be so constructed that it is capable of damped oscillations.

With such a system and for a self-sustained oscillation having a sinusoidal wave form, a minimum phase lag of 180° is required between the control impulse applied to a plant and the corresponding response of the measuring apparatus.

With "proportional" control, the displacement $y$ of the regulating valve is in proportion to the departure $x$ of the measured variable under control from its set value, or (with unity constants throughout), $y=x$ and, with a sinusoidal variation or $x$, $x=\sin t$ consequently $y=\sin t$ or $y$ is theoretically in phase with $x$ so that, in other words, there is no lag. Since in practice there is ordinarily a slight lag due to some slowness of response of the valve due to, e. g., with an air-operated valve, the capacity of the air chamber of its proportional spring-opposed diaphragm-actuator, the actual lag has a real value.

With "floating" control, the rate $$\frac{dy}{dt}$$

of movement of a regulating valve, $y$ being the displacement of the valve, is proportional to the departure of the measured variable $x$ under control from its set value, or $$\frac{dy}{dt}=x$$

with a sinusoidal variation of $x$ $x=\sin t$ consequently $$\frac{dy}{dt}=\sin t$$

and $y=-\cos t$ or $y$ theoretically lags 90° behind $x$. In practice, there is ordinarily a further additonal lag due to slowness of response of the valve due to, e. g. with an air-operated valve, the capacity of the chamber of the floating piston valve-actuator so that the actual lag slightly exceeds 90°. The amount of lag necessary may vary slightly with the wave form of the oscillation, but with a sinusoidal wave by way of example, it is known that the lag should be 180° where the proportional method of control is used (i. e. one in which the extent of the control effect is proportional to the deviation and without lag) or at least 90° where the floating method (i. e. one in which the control effect varies at a speed dependent on the departure and lags 90° behind the departure) is used, the value of lag for a combination of proportional and floating control being between these two values of lag of 180° and 90°. It may pay to drop back for a moment to consider the fundamental law of control that an increase of the sensed value requires a controlling action to reduce such value; with steady, sinusoidal oscillations of the sensed value, this requires that the controlling action lag 180° behind the sensed value. With a simple throttling controller, this is attained at once by having the fuel supply valve close when the temperature rises, thus maintaining the 180° lag necessary. However, a simple floating controller has its pilot thus moved but the action of the main control valve must lag up to 90° behind the pilot so that a minimum additional lag of 90° is needed when such pilot is used to govern the actuation of the shadow plant.

In this paragraph is considered the performance, as regards hunting, of the shadow plant with various degrees of lag. With zero lag for proportional control of the shadow plant behind the measured variable, the response of the shadow plant simply corresponds continuously with the value of the variable and the shadow plant consequently cannot hunt independently of the main plant. With the 90° lag for floating control and with correspondence of the response of the shadow plant to the position of the regulating valve, the shadow plant response lags 90° due to such followup action in which a change of the pilot is continuously opposed by motion of the pilot in the opposite direction, due to the shadow plant, so that there can consequently be no self-continuing hunting of the shadow plant. Since the shadow plant response opposes the pilot change, this opposition virtually amounts to 180° lag. The situation thus is physically like that of a pendulum swinging on a horizontally movable support: if the support is sinusoidally shifted with the frequency of the pendulum and so that it lags or leads the phase of the pendulum the swinging respectively dies out or increases. In other words: with less than 180° lag, the shadow plant continuously opposes hunting; but with 180° lag, the shadow plant tends to at least maintain hunting. While this concept may appear to be somewhat loosely expressed, it serves to give a true picture of the phenomenon involved without recourse to the higher mathematics involved in a more formal statement.

However, a fuller comprehension of lag may be obtained from the study of a typical mechanism for producing lag: a capacity which is connected by a flow-resistor to a supply which has varying pressure, the lag under consideration being that of the pressure of the capacity behind that of the supply. A substantially lineal relation $$\frac{dQ}{dt}=p_1-p_2$$

exists between the discharge, i. e. the quantity-rate of flow, through a capillary resistance and the pressure difference across the resistor between the supply and the capacity. The rate of change of pressure in the capacity is substantially proportional to the discharge into the capacity or $$\frac{dp_2}{dt}=\frac{dQ}{dt}$$

With a sinusoidal variation of the supply pressure $p_1=\sin t$ and where the capacity and resistance are large enough so that the cyclical change in $p_2$ does not appreciably affect the value of $p_1-p_2$, the relation is $$\frac{dp_2}{dt}=a \sin t$$

and consequently $p_2=-a \cos t$ where $a$ is the constant of attenuation, from which $p_2$ is seen to lag 90° behind $p_1$. Since the effect of the variation of $p_2$ on $p_1-p_2$, with practicable values of the resistance and the capacity, is obviously to reduce the lag slightly below 90°, it is necessary to use three resistors-and-capacities, to obtain a lag of 180° (that required for shadow plant hunting with proportional control) and to use two resistors-and-capacities, to obtain a lag of 90° (that required for shadow plant hunting with floating control). In other words, one such resistor-and-capacity unit can not produce oscillations, instead a plurality of these must be used. As is brought out later herein, a heated bi-metallic strip can be used in place of a plurality of separate resistor-and-capacitor units since it provides a distributed resistance and capacity effect which is the equivalent of that provided by a large number of separate resistor-and-capacity units. Since in heat transfer the attenuation due to resistance is well known to be usually relatively high, such oscillations would consequently tend to be suppressed unless the arrangement be such that the capacity effect is appreciable.

While the invention can be carried into effect by various devices, one of these may be taken as an example. In this device, a part responsive to a change of the main plant from the desired condition (e. g. in a temperature control, the change of temperature from a predetermined value) can be applied to one point of a floating lever, another point of which is connected with a pilot valve which controls the supply of air to an air-actuated means controlling a valve which regulates the temperature of the main plant. The outlet from the pilot valve is connected in series with a capillary, a first capacity, a second capillary, and a second capacity. With such a proportional (proportional displacement) controller, 180° lag of the shadow plant is required since the regulating valve has negligible lag behind the measuring condition and the mechanism fixes a lag of 180° between the responsive part and the pilot valve. In this case, the second capacity is connected in series with a third capillary, a third capacity and the interior of a bellows which is linked to a third point of the floating lever. With a floating (proportional speed) controller, at least 90° lag of the shadow plant is required since the regulating valve lags 90° behind the measured condition, in which case the second capacity is connected to the bellows. Thus with either proportional or floating control, when the floating lever is displaced in response to a change of the main plant, the pilot valve is operated to admit air to the stated air-actuated means to move the control valve for the main plant and this air passing through the capillaries and the capacities produces in the bellows a pressure which lags at least 180° behind such change. This bellows reacts to modify the position of the floating lever and hence to superpose, on the control effect transmitted to the main plant, a second control effect derived from the shadow plant.

It is essential with a hunting shadow plant (which is not a mere asymptotic reset device in which, as is well known, the direction of reset action may either assist or oppose the primary controlling action) that any movement of the pilot due to changes of the temperature, or other controlled variable, of the main plant be opposed by the subsequent changes of the shadow plant, both initial and average, in spite of the heavily-damped shadow plant oscillations. Therefore the effect of the shadow plant is to reduce the overall sensitivity of the apparatus from that of the same apparatus with the same measuring sensitivity. However, since the shadow plant considerably increases the stability of control, the measuring sensitivity with the shadow plant added can be increased so much with satisfactorily stable control that the overall sensitivity is considerably greater than could otherwise be employed. In the foregoing, sensitivity is broadly the ratio of effect to cause, taken in the same sense. For overall sensitivity, this ratio may be considered as that of the ultimate uncontrolled change of a variable to the ultimate controlled change of the variable for the same change in a condition of the system affecting the variable; actually this overall sensitivity amounts to taking the ratio of uncontrolled drift to controlled drift, where "drift" is the "load error" or departure of the variable from its set value due to a change in the load, which definition consequently involves the characteristics of the main plant as well as those of the controller.

The invention is illustrated in the accompanying diagrammatic drawings, Figs. 1–5 of which illustrate several forms of apparatus for carrying the invention into practical effect. Fig. 2 is shown diagrammatically as to the actuator for the floating controller and the means by which it influences the pressure to the shadow plant.

Figure 1:
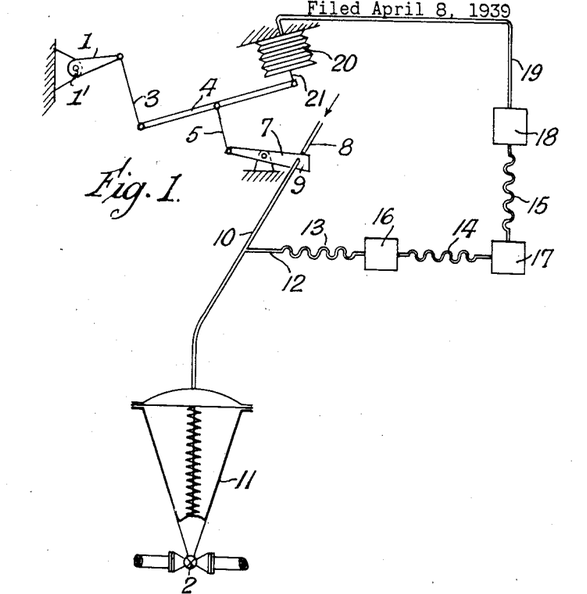
Fig. 1 diagrammatically shows, generally in elevation, a controller including a pneumatic shadow plant having three pneumatic resistors-and-capacities, and a spring-opposed diaphragm-operated regulating valve "proportionally" governed by a measuring instrument.

In Fig. 1, a member 1 moves in correspondence with the value of the variable of the main plant, and a control valve 2 is operated to regulate the value of the variable: e. g. in the case in which temperature is being controlled, the member 1 would respond to a change in temperature from some predetermined value and the valve 2, governed in the manner referred to hereafter, would effect regulation of the supply of heating medium to the main plant. In the arrangement shown, the member 1 constitutes an arm pivoted at 1' and connected by a link 3 to one point of a floating lever 4. This lever 4 is connected at another point by a link 5 to a shutter or chopper 7 movable more or less between opposed nozzles 8, 9, the upper edge of shutter 7 being the controlling edge. Air or other fluid under pressure, usually at 15–20 lbs. per sq. in, gauge pressure, is supplied to the nozzle 8 and passes therefrom towards the nozzle 9. The quantity of air which reaches the nozzle 9 is dependent upon the degree to which the upper edge of chopper 7 moves between the nozzles to intercept the flow.

The nozzle 9 is connected by a pipe 10 to a diaphragm apparatus 11 for operating the valve 2 and also through a branch pipe 12 to a shadow plant which consists, in the arrangement shown, of three capillaries 13, 14, 15 and three capacities 16, 17, 18 of approximately e. g. 6 cu. in., the whole providing a system which is capable of oscillating at a frequency which is higher than the natural frequency of oscillation of the main plant. Each resistor generally has a resistance of the order of that of a needle valve consisting of a tapered plug 3/16" long and 1/32" in diameter in a tapered hole. The shadow plant shown has a lag of 180°. When 90° lag is required, as for the device of Fig. 2, the third capillary 15 and capacity 18 would be omitted. Whether three capillaries and three capacities or only two capillaries and two capacities are provided, the terminating capacity is connected through a pipe 19 to the interior of bellows 20 which is connected by a rod or link 21 to a third point on the floating lever 4. As will be apparent to those skilled in the art, the shadow plant frequency may be increased by, e. g., a reduction of the values of either the capacities 16, 17 and 18 or the resistances 13, 14 and 15 of Figs. 1–3 (as by shortening the latter or enlarging their cross-sections). By such reduction of either or both of these, the frequency of the shadow plant may be readily raised over that of the variable to be controlled in the main plant. It should be repeated here that, no matter what are the relative values of resistance and capacity, a single resistor-and-capacity unit will not cause hunting oscillations and hence can not affect the hunting frequency of the main plant.

When now the member 1 moves in response to a change in the variable, its movement is imparted through the floating lever 4 to the chopper 7 which sets up a change in the air pressure in the pipe 10. This change operates not only on the diaphragm apparatus 11 but also through the pipe 12 on the shadow plant which establishes an air pressure in pipe 19 lagging by respectively 180° and 90° behind the impulse for the controllers of Figs. 1 and 2. This air pressure is applied to the bellows 20 and hence to the floating lever 4 in such manner, i. e. with top edge of chopper 7 effective, as to tend to return the chopper 7 towards its original position. he position of the chopper 7 due to the initial movement derived from movement of the member 1 is thus modified by the control effect of the shadow plant before the main plant appreciably responds, with the result that any change in the value of the variable from the desired value causes the valve 2 to exercise a control effect which causes the variable to return to the desired value without appreciable hunting due to the "anticipatory" action of the shadow plant, i. e. the shadow plant response anticipates that of the main plant and initiates the proper controlling action before the main plant can begin to hunt. In other words, it may be said that a change in the value of the variable sets up an impulse which is applied to the control valve 2 and to the shadow plant which itself sets up a modifying lagging control impulse and having a frequency due to the shadow plant itself which is higher than that of the main plant, the modifying control impulse being applied to modify the control effect exercised by the control valve 2.

In résumé, it is the shadow plant's response to a sudden change which has a higher frequency than that of the variations of the measured temperature of the main plant. The control valve 2 for the main plant sets up controlling impulses having substantially the frequency of oscillation of the shadow plant since it is controlled by the shadow plant through the latter's connection with their common pilot chopper 7. The chopper is actuated by bellows 20 and the air pressure in bellows 20 lags 180° behind that in pipe 10 to the diaphragm actuating main control valve 2 because of the operative connection of bellows 20 through floating lever 4 and link 5 to chopper 7 and the fact that such chopper opens ports 9 to increase the air pressure in pipe 10 upon a decrease in the air pressure in bellows 20, however obtained.

*In operation.*—Upon a change of the measured variable, the "lively" shadow plant responds before the main plant is appreciably affected, and this response causes a prompt corrective movement of the control means. Due to its liveliness, the shadow plant overswings and oscillates in a heavily damped manner so that the oscillations soon become inappreciable. If the main plant felt no effect, the shadow plant would cause the control valve to oscillate symmetrically in a damped manner about its next steady position. Instead meanwhile, the main plant is responding to the change and the measured variable is approaching its new steady value. This effect of the response of the main plant is to cause the control valve to cyclically move by a few rapidly diminishing steps from its latest to its next steady position. This is an excellent method of control since it gives the measuring instrument time to respond between valve adjustments and thus minimizes the unstabilizing effects of any metering lag in the instrument itself.

Figure 2:
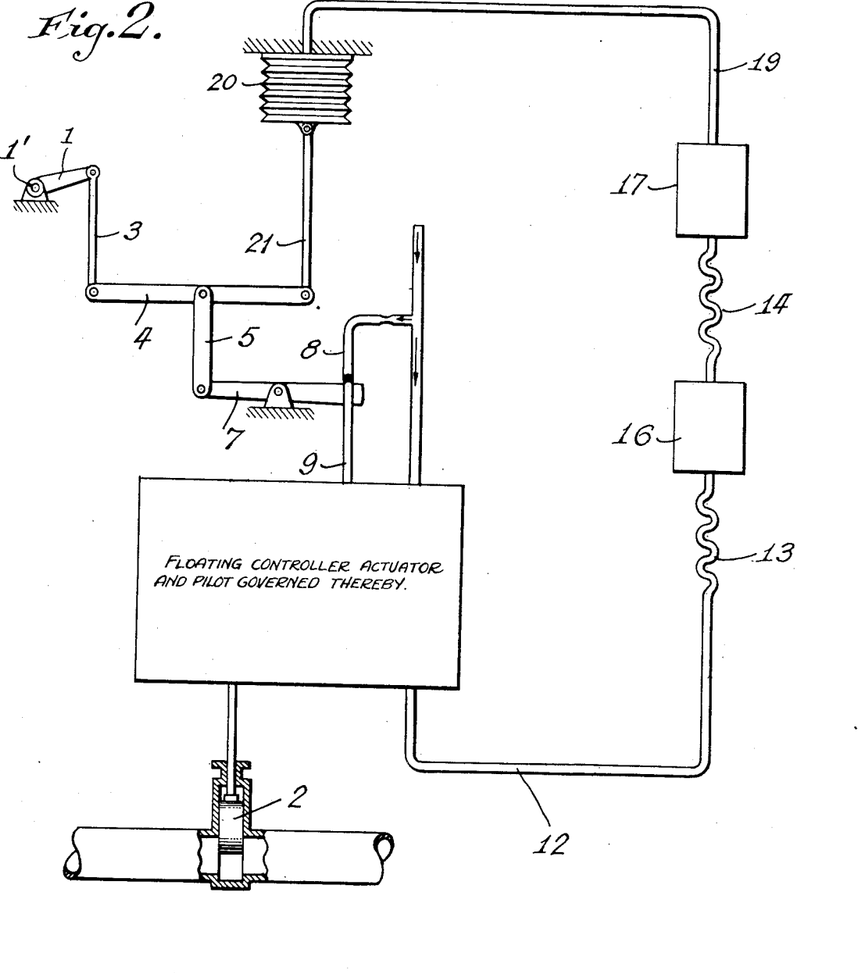
Fig. 2 similarly shows a controller, generally like that of Fig. 1 but in which the shadow plant has only two resistors-and-capacities and the control valve is positioned in a "floating" control relation with the instrument. Controller actuators, and pilots governed thereby, are well known in the art, e. g., see Patents 173,395 and 2,147,977, respectively to Dechamp and to Källe, for a typical floating controller actuator, and Patents 1,685,749 and 1,796,968, respectively to Pfau and to Smoot, each showing a pilot governed by an actuator for a controller which would give floating control but for the follow-up linkages attached. Accordingly.

The arrangement of Fig. 2 is generally similar to that of Fig. 1, although it is for a floating valve with two resistors-and-capacities in the shadow plant instead of a proportional valve with three resistors-and-capacities in the shadow plant.

A measuring instrument (not shown) for the variable to be controlled angularly positions member 1 about its pivot 1' in correspondence with the measured value of the variable. Member 1 has a hole for pivotally connecting link 3 therewith with the desired "measuring sensitivity," link 3 being pivotally connected with the lefthand end of floating lever 4 as in Fig. 1.

Also as in Fig. 1, the free end of shadow plant bellows 20 is connected with the righthand end of floating lever 4.

Two resistors-and-capacities are used and these are connected with pipes 12 and 19.

An analysis earlier herein of the controller of Fig. 2 shows that, in normal operation, valve 2 lags 90° behind chopper 7 due to its floating action, which 90° lag is used as a portion of the lag required for the self-generating hunting of the shadow plant. In other words, a pilot movable with valve 2, in a floating relation with chopper 7, replaces the capacity 18 and its associated resistor 15 of Fig. 1 as a lag-producer, the result being, in both Figs. 1 and 2, that there is the 180° lag of the free end of bellows 20 behind member 1 necessary for the required liveliness of the shadow plant.

Figure 3:
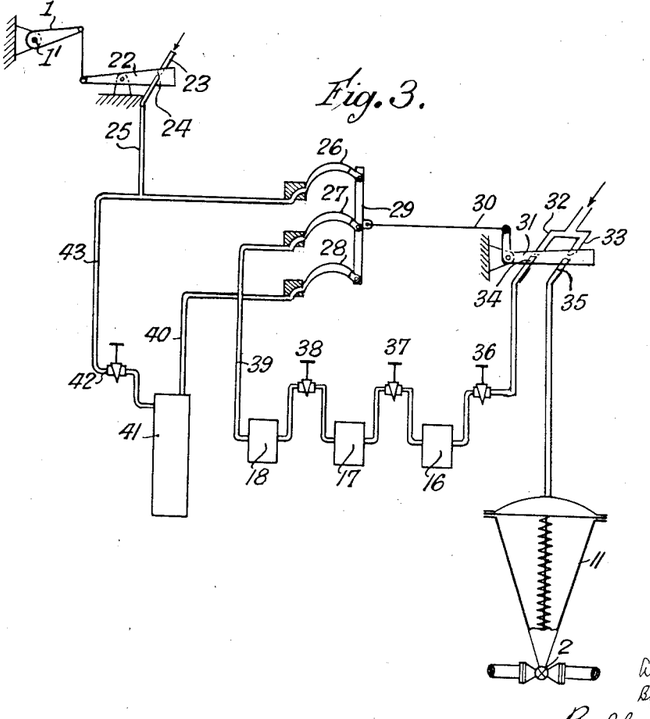
Fig. 3 similarly shows a controller in which the pneumatic shadow plant is separate from both the instrument and the regulating valve, being telemetrically connected with each by pressure only and being more complex.

In the modified arrangement shown in Fig. 3, the responsive member 1 controls a chopper 22, only one edge of which is effective, moving between nozzles 23, 24 of which the nozzle 23 is supplied with fluid under pressure while the nozzle 24 is connected by a pipe 25 to a Bourdon tube 26 forming with two other Bourdon tubes 27, 28 a nest of Bourdon tubes which are pivotally connected together at their free extremities by a bar 29. The bar 29 is connected by a link 30 to a second chopper 31 which works with only its lower edge effective between pairs of nozzles 32, 33 and 34, 35, fluid being supplied under pressure to the nozzles 32, 33 from a common supply. The nozzles 34, 35, are respectively connected to a shadow plant system and to a diaphragm assembly 11 which, as before, operates the control valve 2. The shadow plant in this arrangement includes the capacities 16, 17, 18 and constrictions constituted by needle valve 36, 37, 38 and the termination of the shadow plant is connected by a pipe 39 to the second Bourdon tube 27.

Hence with the parts so far described with reference to Fig. 3, movement of the member 1 will cause the Bourdon tube 26 to be distorted by fluid passing thereto under the control of the chopper 22, and this tube 26 will operate the chopper 31 to apply a fluid pressure change to the diaphragm 11 and also to the shadow plant 16, 17, 18 which in turn will affect the fluid pressure to the tube 27 so that the resulting movement of the bar 29 is compounded of the control effects due to the movement of the responsive member (producing deformation of the tube 26) and the control effect due to the shadow plant (producing deformation of the tube 27) the deformations of both of these two tubes being applied to the bar 29 and thence to the control valve 2.

In cases where it is desired that an additional control effect (producing a control component operating at a speed dependent on the rate of departure of the variable from the desired value) should also be applied, the third Bourdon tube 28 is employed and is connected by a pipe 40 to a further system comprising a capacity 41 and a resistance 42 constituted by a needle valve. This system has fluid pressure transmitted to it through a pipe 43 from the pipe 25, this capacity 41 being large compared with the capacities 16, 17, 18, i. e., of the order of ten to twenty times as much as one of the shadow plant capacities 16, 17 or 18, so as to produce a control operation having appreciable lag and the resulting fluid pressure change passes to the Bourdon tube 28 which imposes on the bar 29 a further or floating control effect. With a clockwise movement of member 1, shutter 22 moves in a counterclockwise direction and admits more air to line 25 so that Bourdon 26 immediately expands to force bar 29 to the right thus moving shutter 31 in a clockwise direction to shut off the flow of air in the line 34. Bourdon 27 then contracts and the three capacities 16, 17, 18 and their associated resistors 36, 37, 38 cause the existence of a tendency for a self-sustaining oscillation of flapper 31 and hence of valve 2. In the meantime, the increased air pressure in line 25 forces air through resistor 42 into large capacity 41 which is connected with Bourdon 28 which expands in a delayed manner. In résumé, upon a change in the position of member 1, the operation is that Bourdon 26 moves bar 29 to the right (in Fig. 3) and Bourdon 27 soon thereafter moves bar 29 to the left and sets up oscillations of bar 29, and finally the effect of the changed position of member 1 reaches Bourdon 28 which gives a further effect in the direction of Bourdon 26 so that the net result is that the device has a low initial sensitivity and a high ultimate sensitivity with the initial lowering of the ultimate high sensitivity depending upon the rate of movement of member 1.

Figure 4:
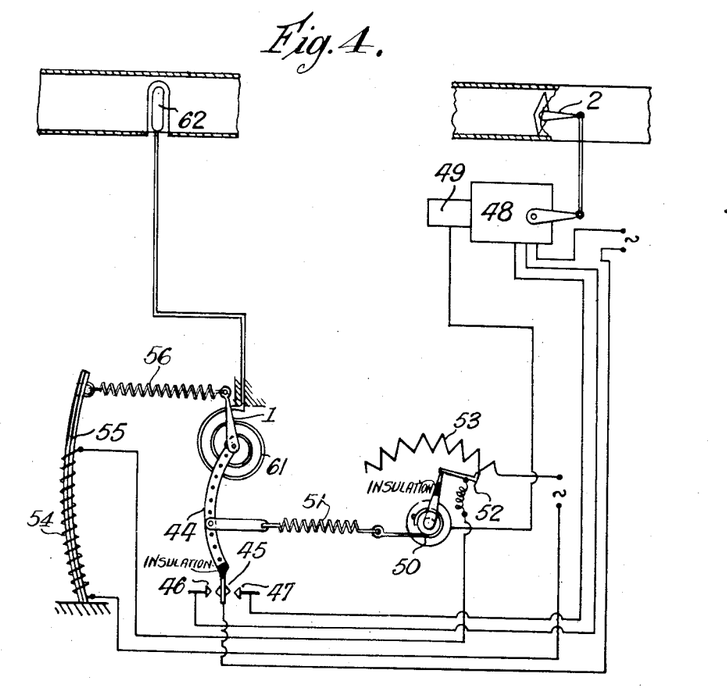
Fig. 4 shows a controller in which an electrical shadow plant affects a motor-operated regulating valve having a telemetric followup to the instrument.

In the arrangement shown in Fig. 4, the member 1 is shown as operated by a Bourdon tube 61 regulated by a bulb 62 connected therewith by capillary tubing as usual, responsive to the variable temperature being controlled.

In the arrangement of Fig. 4, the responsive member 1 is secured to an arm 44 having a double-acting contact 45 movable between contacts 46, 47 controlling an electric motor in a gear box 48, the motor controlling the position of the control valve 2. A self-synchronous telemetric transmitter diagrammatically indicated at 49 is moved by valve 2 or its motor and transmits an electrical impulse to a similar telemetric receiver 50 so that the movement of the valve 2 causes a corresponding movement of the receiver 50. The movement of the receiver is applied to control the loading of a spring 51 operating on the arm 44 (and hence operatively connected with the responsive member 1) and also to control through a wiper 52 a variable resistance 53. This resistance controls the supply of current to a heating coil 54 around a bi-metallic strip 55 having its free end also connected through a spring 56 to the member 1, the strip 55 flexing or bending to an extent dependent on the heating effect of the coil 54. As is well known to those skilled in the art, a reduction of the lag of bi-metallic strip 55 and hence an increase of the hunting frequency of the shadow plant accompanies, e. g., a reduction in either the mass of the heated metal of the strip or the resistance of the heat flow path between heating resistance coil 54 and bi-metallic strip 55.

When the responsive member 1 moves in response to change in the variable from the desired value, the contact 45 is moved to engage contact 46 or 47 depending on the direction of change and this engagement in turn causes the control valve 2 to be moved to alter the value of the variable, the change in which caused the responsive member 1 to move. The movement of the valve 2 is transmitted through the telemetric arrangement and the spring 51 to break the stated engagement of the contacts. The variable resistance 53 simultaneously operates to control the heat applied to the strip 55 which operates, with sufficient lag to act as a lively shadow plant, i. e. as the three resistors-and-capacities of Fig. 1, the spring 56 to enable the contact 45 to engage the other contact 46 or 47 and thus cause a modifying control effect to be superposed on the original control effect, and so on. In other words, there are two reinforcing followup systems: system 49—51 provides an immediately effective followup between valve 2 and member 1, and system 49—50 and 52—56 provides a delayed shadow plant followup which acts to reduce the change of the pilot, essentially as in Fig. 1. In an operative sense, the heated strip comprises a distributed heat capacity and resistance to heat flow which is equivalent, as regards lag, to the several air capacities and resistances connected in series. This strip 55 constitutes a shadow plant which has a tendency to sustain oscillations upon a sudden change of the value of the temperature of element 62 instead of a reset such as is described in the next paragraph, which reset is for the purpose of providing a delayed response which slowly raises the sensitivity by bucking the action of shadow plant strip 55 with that of an opposing reset strip 57 which moves aperiodically or with an asymptotic approach to its final position following a change of temperature, sudden or otherwise. Strip 55 is not a reset but is a self-generating hunting device which acts promptly upon a change of the controlled variable to reduce the hunting of such variable.

The functions of springs 51 and 56 in the modification of Fig. 4 are to respectively carry (to the Bourdon-positioned member 1) forces proportional to the movements of valve 2 and of the shadow plant's bi-metallic strip 55. These functions are like those of the device of Fig. 3 in which member 29 takes a chopper-controlling position in response to forces (due to air pressures) and are equivalent to the device of Fig. 1 in which floating lever 4 has a point (pivoted to link 5) which takes a chopper-controlling position jointly in response to changes in the position of member 1 and of bellows 20. It may be noted that the usual bi-metallic strip 55 sets up a much more powerful force than does a usual Bourdon tube and that a spring 56 may be used to convert the movement of the strip 55 into a small force which is of the proper order, this same principle being used to convert the displacement of receiver motor 50 (corresponding with the valve movement) into a small force which is also of the proper order.

Figure 5:
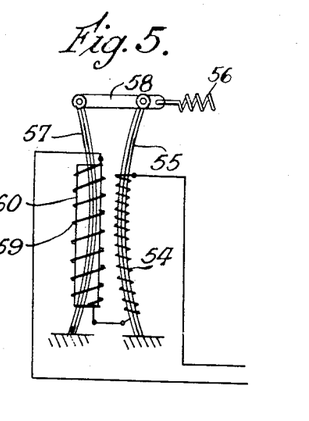
Fig. 5 similarly shows a modification of a portion of the shadow plant of Fig. 4 to introduce a floating reset effect.

When the additional control component of Fig. 3 is to be introduced in the arrangement shown in Fig. 4, the shadow plant modification of Fig. 5 can be employed, this modification including a second bi-metallic strip 57 connected by a link 58 to the strip 55 and being heated by a coil 59 in series with the coil 54: this coil 59 is, however, arranged around a tubular heat-conducting element 60 which produces a considerable lag before the bi-metallic strip 57 produces a control influence on the arm 1. Since strip 57 opposes strip 55, the effect is to tend to make the next steady pull of the shadow plant on spring 56 the same as the latest, and hence to keep the controlled variable practically to a single set value except for the slight "play" between contact 45 and contacts 46, 47. Since bi-metal strips 55 and 57 ultimately balance, it is possible to have the direction of operation of both reversed without departing from my invention should the plant characteristics be such as to make this change desirable.

To tune in the device of Fig. 4, whether or not modified as in Fig. 5, the upper end of strip 55 is held immobile at its median position and the control point set to the desired value by angularly positioning the fixed end of strip 55.

While "capacity" has been used loosely in a customary sense elsewhere in the specification respectively for an element, such as e. g. pneumatic tank 16 in Fig. 1, having capacity, the term "capacitor" is used in its stead in the claims following the accepted electrical terminology.

The terms and expressions which I have employed are used as terms of description and not of limitation, and I have no intention, in the use of such terms and expressions of excluding any equivalents of the features shown and described and portions thereof, but recognize that various modifications are possible within the scope of the invention claimed. It is my intention to claim whatever patentable subject matter is disclosed in the drawings and the foregoing specification.

I claim:

1. The steps in the method of effecting automatic control of a variable of a plant which comprise applying to a control for the variable a control effect established by an initiating impulse substantially coincident with a change in the value of the variable and modifying such effect by a gradually dying train of damped oscillatory and amplified control effects the first of which lags behind the initiating impulse by 180°, the frequency of such oscillations being higher than the natural frequency of oscillation of the plant.

2. The method of controlling a system, including a plant which has a tendency to produce hunting at one frequency, to maintain the actual value of a physical condition at a point in the plant at least approximately at a predetermined value, which comprises sensing a departure of said actual value from the predetermined value, initiating from said sensing a plurality of gradually dying governing oscillations, said oscillations having a higher frequency than that of the plant and having the amplitude of the first swing exceed the value ultimately required for control, and regulating said physical condition jointly according to said sensing and to said dying oscillations, the regulation being in a direction to oppose the departure.

3. The steps in the method of controlling a system, including a plant which has a tendency to produce hunting at one frequency and a governing device for the plant, to maintain the actual value of a physical condition at a point in the plant at least approximately at a predetermined value which comprises sensing a departure of said actual value from said predetermined value, initiating from said sensing a change in a physical condition of one portion of the governing device, delaying the response of another portion of said device to the change of said condition, and setting up a gradually dying train of oscillations of said response by initiating a further and exaggerated change in the condition of the second mentioned portion of said device in which the initial over-swing lags 180° behind such initiating actions.

4. The method of controlling a system, including a plant which has a tendency to produce hunting at a determinable frequency and a fluid-containing governing device, to maintain the actual value of a physical condition at a point in the plant at least approximately at a predetermined value which comprises sensing a change in said actual value, modifying in accordance with such sensing the value of the pressure of the fluid in a portion of the governing device, from such pressure modification initiating in another portion of the device a succession of damped governing pressure oscillations, the first of which lags 180° behind said sensing, and so regulating said physical condition according to said sensing and to said pressure that both the initial and average effects of the pressure oscillations are in a direction to reduce the amount of change of the regulation and the regulation is in a direction to oppose the sensed change.

5. The method of controlling a system, including a plant which has a tendency to produce hunting at a determinable frequency and a fluid-pressure type of governing device, to maintain the actual value of a physical condition at a point in the plant at least approximately at a predetermined value which comprises sensing a change in said actual value, in accordance with said sensing acting to modify the value of both a prompt and a delayed response of the fluid pressure, acting reactively in accordance with the value of said delayed response to oscillatably modify the value of the prompt response in the opposite direction from that of the delayed response and at a higher frequency than that of the main plant, the delayed response lagging the prompt response by 180° to cause the oscillations thereof to tend to be self-sustaining, and governing the regulation of the plant by said prompt response in a direction to oppose the sensed change and so that the effect of the pressure oscillations of the prompt response is in a direction to reduce the amount of change of the regulation.

6. The method of controlling a system, including a plant which has a tendency to produce hunting at a determinable frequency and a fluid-pressure type of governing device, to maintain the actual value of a physical condition at a point in the plant at least approximately at a predetermined value which comprises sensing a change in said actual value; in accordance with said sensing acting to modify the value of both a prompt and a delayed at least approximately critically damped response of a fluid pressure in a common direction; in accordance with both said pressure responses acting to modify the value of both a prompt and a delayed underdamped response of a second fluid pressure; acting reactively in accordance with the value of the last named delayed response to oscillatably modify the value of the last named prompt response in the opposite direction from that of such delayed response and at a higher frequency than that of the main plant, such delayed response lagging such prompt response by 180° to cause the oscillations thereof to tend to be self-sustaining; and governing the regulation of the plant according to the first named prompt and delayed responses and the last named delayed response to have the regulation of the plant by the first named prompt response occur in a direction to oppose the sensed change, to have the last named delayed response initially oppose the first named prompt response, and to have the first named delayed response gradually approach a final value to reinforce the effect of the first named prompt response on the regulation to increase the ultimate overall sensitivity of controlling.

7. The method of controlling a system, including a plant which has a tendency to produce hunting at one frequency, to maintain the actual value of a physical condition at a point in the plant at least approximately at a predetermined value which comprises sensing a change of said actual value, initiating from such sensing damped oscillations for governing the regulation as one component, said oscillations having a higher frequency than that of the plant, setting up an additional component which depends upon the rate of change of said sensing, and so regulating the physical condition jointly according to said sensing and to both of the governing components that the initial effect of the governing oscillations is in a direction to temporarily decrease the amount of change of regulation, the regulation is in a direction to oppose the change of the sensed value, and the additional component is in the same direction as that of the sensed change.

8. The steps in the method of effecting automatic control of a variable of a plant which comprise applying to a control for the variable a control effect established by an initiating impulse substantially coincident with a change in the value of the variable and modifying such effect by an oscillatory and amplified control effect lagging on the initiating impulse and also by a control effect having a rate dependent on the extent of departure of the variable, the frequency of such oscillation being higher than the natural frequency of oscillation of the plant.

9. The method of controlling a system, including a plant which has a tendency to produce hunting at a determinable frequency and a heat-responsive controlling device in a portion of which the resultant temperature lags 180° behind changes in a regenerative heat input thereto and hence dampedly oscillates upon a sudden change of said heat input, to maintain the actual value of a regulated physical condition at a point in the plant at least approximately at a predetermined value which comprises sensing a departure of said actual value from said predetermined value, regulating said condition in proportion to the amount of said departure, altering the said regenerative heat input rate in proportion to the change in the regulation, and oscillatingly modifying the regulation at a higher frequency than said determinable frequency in accordance with the delayed resultant temperature change by both initial and average amounts and in a direction to decrease the effect on the regulation of the sensed departure, the stated high frequency oscillations being damped to form a gradually dying train of oscillations with the start of the initial swing lagging 180° behind the sensed departure.

10. In a control system including a plant in which the value of a physical condition at a point therein has a tendency to oscillate at a particular frequency and is to be controlled, the combination of a measuring element sensitive to said value, a pilot means moved by said element upon a change in said value, a regulator for said value governed by said pilot means, and a device which has a tendency to oscillate at a frequency higher than that of said plant, said device having an oscillatable portion operatively connected with said pilot means to affect said pilot means in a direction to reduce the amount of its movement upon a change of said value, and another portion which is operatively connected with said pilot means to initiate an oscillation of the first named portion upon a change of said value, said device including means for damping the oscillations of the first named portion, whereby the damped oscillations of the first named portion of said device are shared by said regulator.

11. In a control system including a plant in which the value of a physical condition at a point therein has a tendency to oscillate at a particular frequency and is to be controlled, the combination of a measuring element sensitive to said value, a pilot means moved by said element upon a change in said value, a regulator for said value governed by said pilot means, and a device which has a tendency to oscillate at a frequency higher than that of said plant, said device being operatively connected with said pilot means to have a physical condition of one portion of said device affected by a movement of the pilot means and said device including a movable portion, said device being constructed to cause the physical condition of said movable portion to tend to lag at least 180° behind a change in that of the first named portion and to cause the movement of said movable portion to affect said pilot means in a direction to reduce the amount of the movement of said pilot means and to make the stated lag 180°, whereby the oscillations of said device tend to be self-sustaining and are shared by said regulator.

12. In a fluid-actuated controller of a type which is connected to a fluid supply and includes a portion which moves upon a change in the value of a physical condition to be controlled, the combination with said portion of a fluid-regulating pilot means connectable with said fluid supply and operatively connected with said portion to be actuated by such portion upon the stated change; a fluid-operated regulator for said value operatively connected with said pilot means to be governed by said pilot means; and a fluid-operated governing system comprising a bellows operatively connected with said pilot means to modify its movement upon a change of pressure in said bellows, and three sets of fluid damping means connected in series with and between said bellows and said pilot means and arranged to have said pilot means between said supply and the first of said sets, each set comprising a capacitor and a resistor connected in series with each resistor between its capacitor and the pilot means, whereby oscillations of said pilot means are initiated by a change of the stated condition to be controlled and tend to be self-sustaining.

13. In a control system including a plant in which the value of a physical condition at a point therein has a tendency to oscillate at substantially a particular frequency and is to be controlled, the combination of a measuring element sensitive to said value, a pilot means operatively connected with said element to be moved by said element upon a change in said value, a regulator for said value, a governing system including a power means having a movable portion whose actuation is governed in a delayed manner by said pilot means, a second pilot means whose position is affected by that of said movable portion, and a second governing system including a second power means having a movable portion whose actuation is governed in a delayed manner by said second pilot means and having its said movable portion operatively connected to one of said pilot means to oscillatably actuate it following a change of the sensed value in a direction to oppose such change, at least one of said governing systems including delaying means for causing the responsive movement of the second power means to lag 180° behind the movement of the pilot means to which it is operatively connected, said regulator being operatively connected to the last mentioned pilot means to be regulated thereby in a direction to oppose the change of the sensed value and to be affected by the oscillations of such pilot means.

14. The combination set forth in claim 13 in which one of the governing systems is fluid-operated and the said delaying means thereof comprises at least two sets of fluid damping means connected in series, each set comprising a capacitor and a resistor connected in series.

15. In a control system including a plant in which the value of a physical condition at a point therein has a tendency to oscillate at substantially a particular frequency and is to be controlled, a measuring element sensitive to said value, a pilot means operatively connected with said element to be moved by said element upon a change in said value, and a regulator for said value: a governing system operatively connecting said pilot means with said regulator to change a condition of such system in response to the stated movement of said pilot means and to govern the actuation of said regulator in accordance with such change of such condition of the governing system and comprising, in combination, a separate pilot means which is constructed to be positioned in correspondence with the stated change of the governing system in response to the stated movement of the first named pilot means; and a device reactively connected with said governing system to be sensitive to changes of the stated responsive condition and constructed to have a tendency upon a change of such condition to dampingly oscillate at a frequency higher than that of said plant; said device having an oscillatable portion operatively connected to one of said pilot means to have its first swing affect such pilot means in a direction to reduce the amount of its movement upon a change of the measured value, and having another portion operatively connected with the reactively connected pilot valve to be affected by the movement of such pilot means to initiate an oscillation of the first named portion upon a rapid change of the measured value, whereby the damped oscillations of the first named portion of said device are shared by said regulator.

16. In a control system including a plant in which the value of a physical condition at a point therein has a tendency to oscillate at a particular frequency and is to be controlled, the combination of a measuring element sensitive to said value, a pilot means moved by said element upon a change in said value, a regulator for said value governed by said pilot means, and a device which has a tendency to oscillate at a frequency higher than that of said plant, said device having an oscillatable portion operatively connected with said pilot means to have the initial swing of such device affect said pilot means in a direction to reduce the amount of its movement upon a change of said value, another portion which is operatively connected with said pilot means to initiate an oscillation of the first named portion upon a change of said value, said device including means for damping the oscillations of the first named portion, whereby the damped oscillations of the first named portion of said device are shared by said regulator, and a third portion operatively connected with said pilot means to be also affected by the movement of said pilot means and to react thereon to set up in a delayed manner an additional controlling component which depends upon the rate of change of said value and acts in the same direction as that of the sensed change.

17. In a controlling system for the value of a physical condition, the combination of a measuring element varying as in position in correspondence with said value, a regulator for controlling said value, an air-operated motor and its air-regulating pilot means both operatively connected with said regulator and with said element to operate said regulator in accordance with the stated variation of said element, said pilot being operated by said element upon such variation thereof, and an air-operated device constructed to have a portion operatively connected with said pilot to be acted upon by said pilot to alter the air-pressure in said device in accordance with the variation of said element, another portion positioned in correspondence with the value of said air pressure in it and also reactively operatively connected to said pilot means to reduce the initial movement of said pilot means upon a variation of the measuring element, and an intermediate portion comprising a plurality of resistor-and-capacitor units in series operatively connecting the first named and the second named portions to cause the response of the air pressure in the second named portion to a variation of said element to tend to lag at least 180° behind the resultant pressure variation in the first named portion.

18. The combination, with a power-actuated means for controlling the value of a physical condition of a system having appreciable time lag between a controlling action and the response of an element sensitive to said condition, of: an oscillatable pilot means operated by the element to govern by a fluid medium the power-actuated means for controlling the value of the condition, and a damping means affected by said fluid medium and operatively connected to the pilot means to regeneratively affect the operation of the pilot means, said damping means including a distributed capacitor-and-resistor portion sensitive to the fluid medium which is affected by the pilot means to produce a lag between an initial impulse from said pilot means and the reaction of said damping means portion upon said pilot means, the relative values of the capacitor and the resistor components of said damping means portion being such as to set up a gradually dying train of oscillations of said pilot means and hence of said controlling action following a sudden change of the sensed value of said condition and a consequent sudden initial operation of the pilot means and to produce a higher frequency of said oscillations than the natural frequency of the controlled system.

19. Control apparatus comprising, in combination, a fluid-regulating throttling-type pilot positioned in correspondence with the value of a physical condition to be controlled, and a primary governing fluid system connected to and controlled by said pilot and containing a Bourdon tube promptly responsive to the pressure in said system for creating a throttling-control effect and a flow resistance, a capacitor and a second Bourdon tube arranged in series so that the response of said second tube lags behind that of the first in dependence upon the rate of movement of said pilot to produce a delayed resetting effect; two fluid-regulating throttling-type pilot means both operatively connected with and jointly actuated by said tubes; a fluid-operated regulator for said value and operatively connected with and operated by one of said pilot means; and a secondary governing fluid system connected with and controlled by the other of said pilot means and containing a shadow plant including three sets of resistor-and-capacitor units and a third Bourdon tube with the three sets arranged in series between such pilot means and such tube with each resistor between its capacitor and such pilot means to cause the response of the third tube to lag at least 180° behind a movement of such pilot means; said third tube being operatively connected with the last named pilot means in a direction to oppose the action of the first and second tubes; and the first and second tubes being operatively connected with the last named pilot means to add the delayed resetting response of the second tube to that of the first tube.

20. Control apparatus for maintaining a variable in a plant at least approximately at a predetermined value and comprising, in combination, a device including an electrically energizable oscillatable means adapted to cause its oscillations to tend to be self-sustaining and damped and to cause its oscillations to have a frequency of oscillation which is higher than that at which the controlled variable of the main plant tends to hunt, an electrically governable regulator for the plant, a member responsive to a change in the variable from the predetermined value, an electric circuit connected to said regulator and including a switch operated by said member to govern the operation of said regulator, a rheostat having a portion operatively connected with said regulator to be positioned in accordance with the position of said regulator, said rheostat being operatively connected with said oscillatable means to control the energization of said oscillatable means, and means operatively connecting said rheostat and said oscillatable means to said member to conjointly modify the position of said member and hence of said switch.

21. The control apparatus set forth in claim 20 in which said oscillatable means comprises a bi-metallic strip heated by an electrical heating element the electrical supply to which is controlled by said rheostat, said bi-metallic strip and said rheostat being resiliently connected to said member.

22. The control apparatus set forth in claim 20 in which said device includes an electrically energized element having a lag which is large compared with that of said oscillatable means, the energization of said element being also controlled by said rheostat and also reacting on said member and hence also on said switch.

ALEXANDER IVANOFF.